United States Patent
Fu

(10) Patent No.: US 9,638,943 B2
(45) Date of Patent: May 2, 2017

(54) LCD PANEL AND MANUFACTURING METHOD THEREOF

(71) Applicant: SHENZHEN CHINA STAR OPTOELECTRONICS TECHNOLOGY CO., LTD., Guangdong (CN)

(72) Inventor: Yanfeng Fu, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 227 days.

(21) Appl. No.: 14/410,391

(22) PCT Filed: Oct. 17, 2014

(86) PCT No.: PCT/CN2014/088816
§ 371 (c)(1),
(2) Date: Dec. 22, 2014

(87) PCT Pub. No.: WO2016/008223
PCT Pub. Date: Jan. 21, 2016

(65) Prior Publication Data
US 2016/0252757 A1    Sep. 1, 2016

(30) Foreign Application Priority Data

Jul. 16, 2014  (CN) .......................... 2014 1 0339205

(51) Int. Cl.
*G02F 1/1333*        (2006.01)
*G02F 1/136*         (2006.01)
(Continued)

(52) U.S. Cl.
CPC .............. *G02F 1/1309* (2013.01); *G02F 1/13* (2013.01); *G02F 1/1339* (2013.01);
(Continued)

(58) Field of Classification Search
CPC . H01L 2924/00; H01L 27/12; H01L 29/0665; H01L 29/78696;
(Continued)

(56) References Cited

U.S. PATENT DOCUMENTS 6,188,453 B1      2/2001  Matsuoka et al.
7,839,479 B2 *   11/2010  Choi ................... G02F 1/13458
                                                      349/138
(Continued)

FOREIGN PATENT DOCUMENTS

CN        101738770 A      6/2010
CN        201780437 U      3/2011

OTHER PUBLICATIONS

Office Action issued in Chinese Application No. 201410339205.2; Dated Apr. 25, 2016 (7 pages).

*Primary Examiner* — Huyen Ngo
(74) *Attorney, Agent, or Firm* — Osha Liang LLP

(57) ABSTRACT

An LCD panel, which includes liquid crystal cells, a TFT testing unit, and a gate, source, and drain electrode testing pad, is provided. The TFT testing unit includes three electrode testing wires, each of which has one end connected to a gate, source, or a drain electrode, and the other end connected to a corresponding one of the three electrode testing pads. A manufacture method for the LCD panel is also provided. Electrical measurements of the TFT in the liquid crystal cell is realized.

8 Claims, 2 Drawing Sheets

(51) Int. Cl.
　　　*G02F 1/13*　　　　(2006.01)
　　　*G02F 1/1335*　　(2006.01)
　　　*G02F 1/1339*　　(2006.01)
　　　*G02F 1/1341*　　(2006.01)
　　　*G02F 1/1343*　　(2006.01)
　　　*G02F 1/1368*　　(2006.01)
　　　*G09G 3/00*　　　(2006.01)
　　　*G09G 3/20*　　　(2006.01)
　　　*G09G 3/36*　　　(2006.01)
　　　*G02F 1/1362*　　(2006.01)

(52) U.S. Cl.
　　　CPC .......... *G02F 1/1341* (2013.01); *G02F 1/1368* (2013.01); *G02F 1/133514* (2013.01); *G02F 1/133528* (2013.01); *G02F 1/134309* (2013.01); *G09G 3/006* (2013.01); *G09G 3/2092* (2013.01); *G09G 3/3648* (2013.01); *G02F 1/1333* (2013.01); *G02F 2001/136254* (2013.01); *G09G 2300/0426* (2013.01); *G09G 2330/12* (2013.01)

(58) Field of Classification Search
　　　CPC ....... H01L 2924/13091; H01L 2924/14; H01L 51/0504; H01L 27/3244; H01L 27/3262; B82Y 10/00
　　　USPC .......... 257/737; 438/108; 349/40, 54, 42, 47
　　　See application file for complete search history.

(56) References Cited

U.S. PATENT DOCUMENTS

| | | | |
|---|---|---|---|
| 2002/0089614 A1* | 7/2002 | Kim | ............... G02F 1/1309 349/40 |
| 2004/0027502 A1* | 2/2004 | Tanaka | ............. G02F 1/136204 349/40 |
| 2009/0207333 A1 | 8/2009 | No et al. | |
| 2011/0157099 A1 | 6/2011 | Wang | |
| 2016/0187732 A1* | 6/2016 | Zhao | ............... G02F 1/1362 257/48 |

* cited by examiner

LCD PANEL AND MANUFACTURING METHOD THEREOF

BACKGROUND OF THE INVENTION

1. Field of the Invention

The present invention relates to a field of LCDs (Liquid Crystal Displays), and more specifically to an LCD panel and a manufacturing method thereof.

2. Description of the Prior Art

TFTs (Thin Film Transistors) of a display panel are disposed on an array substrate as switches while the display panel works. They transfer image signals to corresponding pixels in sequence. Therefore, in general, the display quality and lifetime may be eliminated mostly by the TFT electrical measurements.

However, currently, the TFT electrical characteristics can only be measured after the array substrate of the display panel is finished. The TFT works in a liquid crystal cell assembled by the array substrate and a CF (color film) substrate. The TFT electrical measurements performed only to the array substrate cannot represent the TFT electrical characteristics in the liquid crystal cell completely.

Therefore, the design of an LCD panel and a manufacturing method thereof for easily measuring the TFT electrical characteristics in the liquid crystal cell will be a new research and development direction for LCD devices.

SUMMARY OF THE INVENTION

The purpose of the present invention is to provide an LCD panel and a manufacturing method thereof, which is better able to measure the electrical characteristics of the TFT the liquid crystal cell.

To overcome the above-mentioned disadvantages, the technical scheme of the present invention is illustrated hereunder.

An LCD panel, comprises: at least one testing interface having a source electrode testing pad, a drain electrode testing pad, and a gate electrode testing pad, a plurality of liquid crystal cells, and at least one TFT testing unit disposed close to the testing interface, wherein the TFT testing unit comprises:

a TFT provided with a source electrode, a drain electrode, and a gate electrode;

a sealant surrounding the TFT and combining an array substrate and a CF substrate;

a gate electrode testing wire having one end connected to the gate electrode, and the other end passing through the sealant to connect to the gate electrode testing pad;

a source electrode testing wire having one end connected to the source electrode, and the other end passing through the sealant to connect to the source electrode testing pad;

a drain electrode testing wire having one end connected to the drain electrode, and the other end passing through the sealant to connect to the drain electrode testing pad; and liquid crystal molecules, provided between the array substrate and the CF substrate, for simulating an environment of the liquid crystal cells.

Preferably, the TFT testing unit and the liquid crystal cells grow together.

Preferably, the source electrode testing pad, the drain electrode testing pad, and the gate electrode testing pad are all metal sheets.

To overcome the above-mentioned disadvantages, the technical scheme of the present invention is illustrated hereunder.

An LCD panel, comprises: a plurality of liquid crystal cells, at least one TFT testing unit, a source electrode testing pad, a drain electrode testing pad, and a gate electrode testing pad, and the TFT testing unit comprising:

a TFT provided with a source electrode, a drain electrode, and a gate electrode;

a sealant surrounding the TFT and combining an array substrate and a CF substrate;

a gate electrode testing wire, having one end connected to the gate electrode, and the other end passing through the sealant to connect to the gate electrode testing pad;

a source electrode testing wire, having one end connected to the source electrode, and the other end passing through the sealant to connect to the source electrode testing pad; and a drain electrode testing wire, having one end connected to the drain electrode, and the other end passing through the sealant to connect to the drain electrode testing pad.

Preferably, the TFT testing unit is disposed on one side close to the source electrode testing pad, the drain electrode testing pad, and the gate electrode testing pad.

Preferably, the TFT testing unit further comprises liquid crystal molecules provided between the array substrate and the CF substrate for simulating an environment of the liquid crystal cells.

Preferably, the TFT testing unit and the liquid crystal cells grow together.

Preferably, the source electrode testing pad, the drain electrode testing pad, and the gate electrode testing pad are all metal sheets.

To overcome the above-mentioned disadvantages, the technical scheme of the present invention is illustrated hereunder.

A manufacturing method for an LCD panel, comprises the following steps:

preparing an array substrate, the array substrate comprising: a plurality of TFTs provided with a source electrode, a drain electrode, and a gate electrode; at least one testing interface having a source electrode testing pad, a drain electrode testing pad, and a gate electrode testing pad; wherein at least one TFT is used to form a TFT testing unit, and the TFT testing unit comprising: a gate electrode testing wire, having one end connected to the gate electrode, and the other end connected to the gate electrode testing pad; a source electrode testing wire, having one end connected to the source electrode, and the other end connected to the source electrode testing pad; a drain electrode testing wire, having one end connected to the drain electrode, and the other end connected to the drain electrode testing pad;

preparing a CF substrate;

assembling the array substrate and the CF substrate by a sealant to define a holding space formed by the array substrate, the CF substrate, and the sealant, and the holding space having a hole in the sealant for providing liquid crystal molecules;

providing liquid crystal molecules through the hole to the holding space to from a plurality of liquid crystal cells and at least one TFT testing unit;

cutting the CF substrate at the edge of the TFT testing unit until the source electrode testing pad, the drain electrode testing pad, and the gate electrode testing pad being exposed; and attaching polarizers to the array substrate and the CF substrate to form the LCD panel.

Preferably, the TFT used to form the TFT testing unit is disposed on one side close to the testing interface.

Preferably, the source electrode testing pad, the drain electrode testing pad, and the gate electrode testing pad are all metal sheets.

Preferably, steps of preparing the source electrode testing pad, the drain electrode testing pad, and the gate electrode testing pad are: connecting one end of the source electrode testing pad, the drain electrode testing pad, and the gate electrode testing pad to a metal sheet, respectively.

Preferably, the source electrode testing pad, the drain electrode testing pad, and the gate electrode testing pad are connected to a testing device, and evaluate the quality of the LCD panel according to a test result generated by the testing device.

Compared to the prior art, the LCD panel and the manufacturing method thereof in the present invention implement the TFT electrical measurements in the liquid crystal cell according to the design of TFT testing unit.

DETAILED DESCRIPTION OF THE PREFERRED EMBODIMENTS

Please refer to the drawings, wherein the same component symbols represent the same components. The principle of the present invention is implemented in a suitable computing environment for illustrative purposes. The following description is based on the specific illustrated embodiments of the present invention, which should not be construed as limiting the present invention, unless otherwise specified.

Embodiment One

Figure 1:
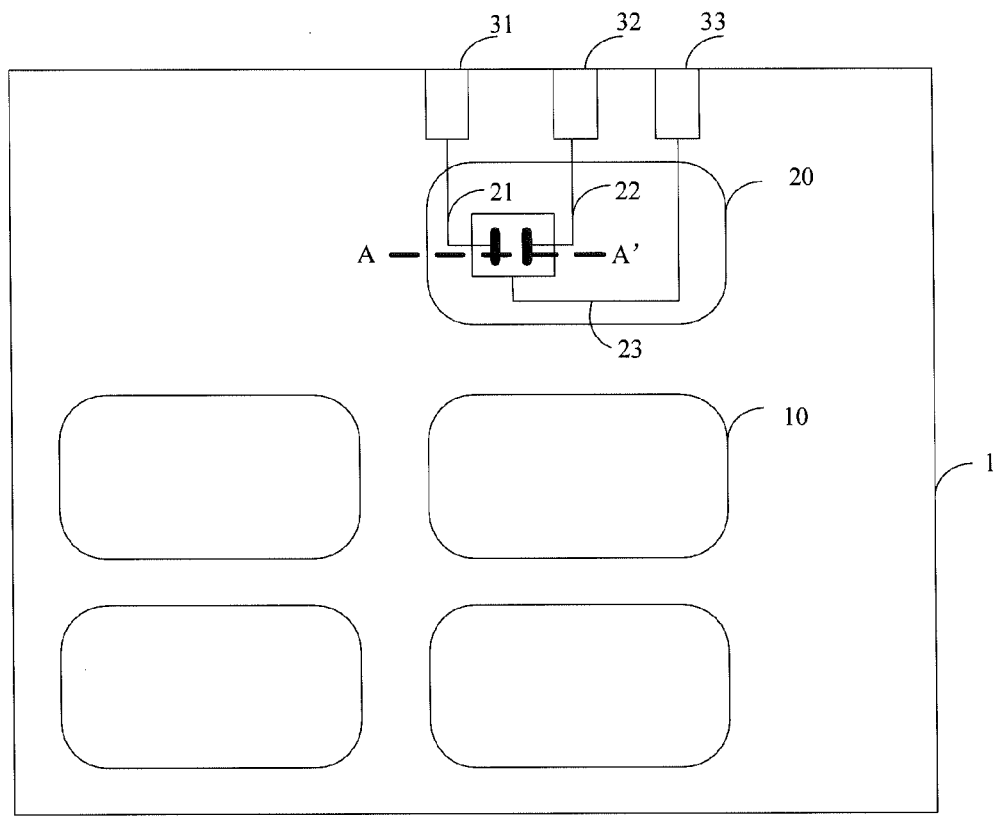
FIG. 1 is a schematic diagram showing an array substrate in an LCD panel in an Embodiment One of the present invention.

Please refers to FIG. 1, which shows an array substrate in an LCD panel in a preferred embodiment of the present invention. The LCD panel comprises a plurality of liquid crystal cells 10, at least one TFT testing unit 20, and at least one testing interface having a source electrode testing pad 31, a drain electrode testing pad 32, and a gate electrode testing pad 33.

Among them, the source electrode testing pad 31, the drain electrode testing pad 32, and the gate electrode testing pad 33 are all metal sheets, and the testing interface formed is connected to a testing device (not shown).

The liquid crystal cell 10 is formed by an array substrate, a CF substrate, and a sealant surrounding the TFT, with liquid crystal molecules provided.

Figure 2:
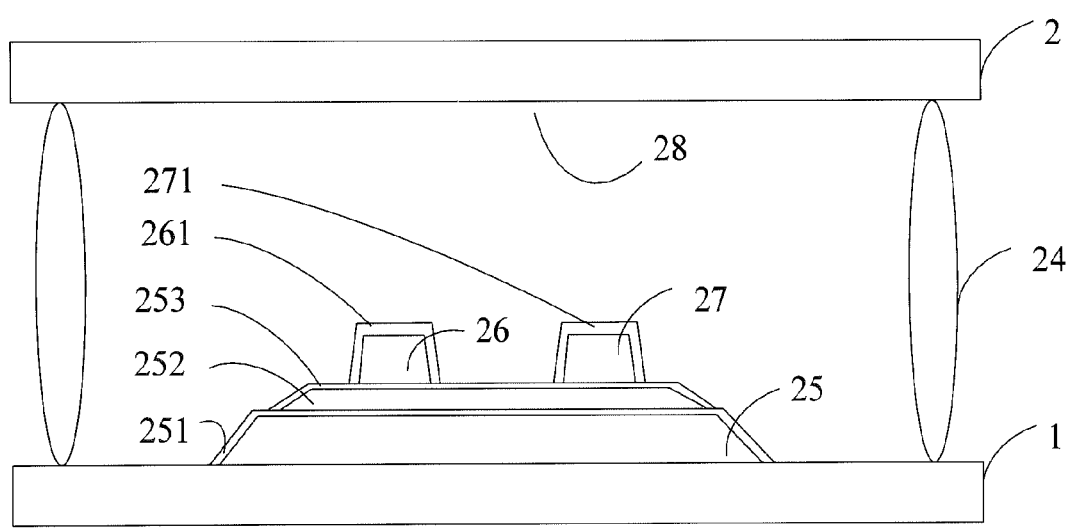
FIG. 2 is a schematic diagram showing a cross-section of a TFT testing unit in the Embodiment One of the present invention.

Please refer to FIG. 1 and FIG. 2, the TFT testing unit 20 comprises: a TFT provided with a source electrode 26, a drain electrode 27, and a gate electrode 25; a sealant 24 surrounding the TFT, and combining an array substrate 1 and a CF substrate 2; a gate electrode testing wire 23 having one end connected to the gate electrode 25, and the other end passing through the sealant 24 to connect to the gate electrode testing pad 33; a source electrode testing wire 21 having one end connected to the source electrode 26, and the other end passing through the sealant 24 to connect to the source electrode testing pad 31; a drain electrode testing wire 22 having one end connected to the drain electrode 27, and the other end passing through the sealant 24 to connect to the drain electrode testing pad 32.

It should be understood, the TFT testing unit 20 may be considered as, when the array substrate 1 is preparing, chosen some TFTs with leading the drain electrode, the source electrode, and the gate electrode to be three testing wires (21, 22, 23), and respectively connected the drain electrode 32 to the drain electrode testing pad 27, the source electrode 31 to the source electrode testing pad 26, and the gate electrode 33 to the gate electrode testing pad 25.

The part of the TFTs to be chosen may be from one row on the outside of the array substrate 1, or some one out of every threshold value on the outside row. For example, disposed on the side close to the testing pads (31, 32, 33), one out of every five of the TFTs will be chosen to be the TFT testing unit 20.

Referring to the FIG. 2, an A-A' cross-section of FIG. 1 is shown, wherein the TFTs grow on the array substrate 1. The metal of the gate electrode 25 covers a gate dielectric 251 (SiN layer), an amorphous silicon semiconductor layer 252 (a-Si:H), and a doped silicon semiconductor 253 (n+a-Si:H) in turn. The metal of the source electrode 26 and the metal of the drain electrode 27 are disposed on the top of the doped silicon semiconductor 253. The source electrode 26 and the drain electrode 27 are usually made of SD metal and coat insulating layers 261 and 271 (PV SiNx) on them.

A preset holding space is reserved between the array substrate 1 and the CF substrate 2, and sealed by the sealant 24 to reserve a hole for providing liquid crystal molecules. The liquid crystal molecules 28 is provided or injected through the hole, and the hole will then be sealed. It should be understood that the sealant 24 surrounds the TFT with the liquid crystal molecules 28 fully filled, for simulating an environment of the liquid crystal cell.

The TFTs in the TFT testing unit 20 and the liquid crystal cells 10 grow together. Therefore, the electrical measurements of the TFT testing unit 20 are equal to the measurements of the liquid crystal cells 10.

It should be understood that when the design of the LCD panel is as in the embodiment one, the TFT testing unit 20 is disposed on one side close to the three electrode pads (31, 32, 33), for convenient measurements. Besides that, in order to reduce dimensions, the TFT testing unit 20 may be cut off after the measurements. Of course, it can be reserved as well.

Embodiment Two

Figure 3:
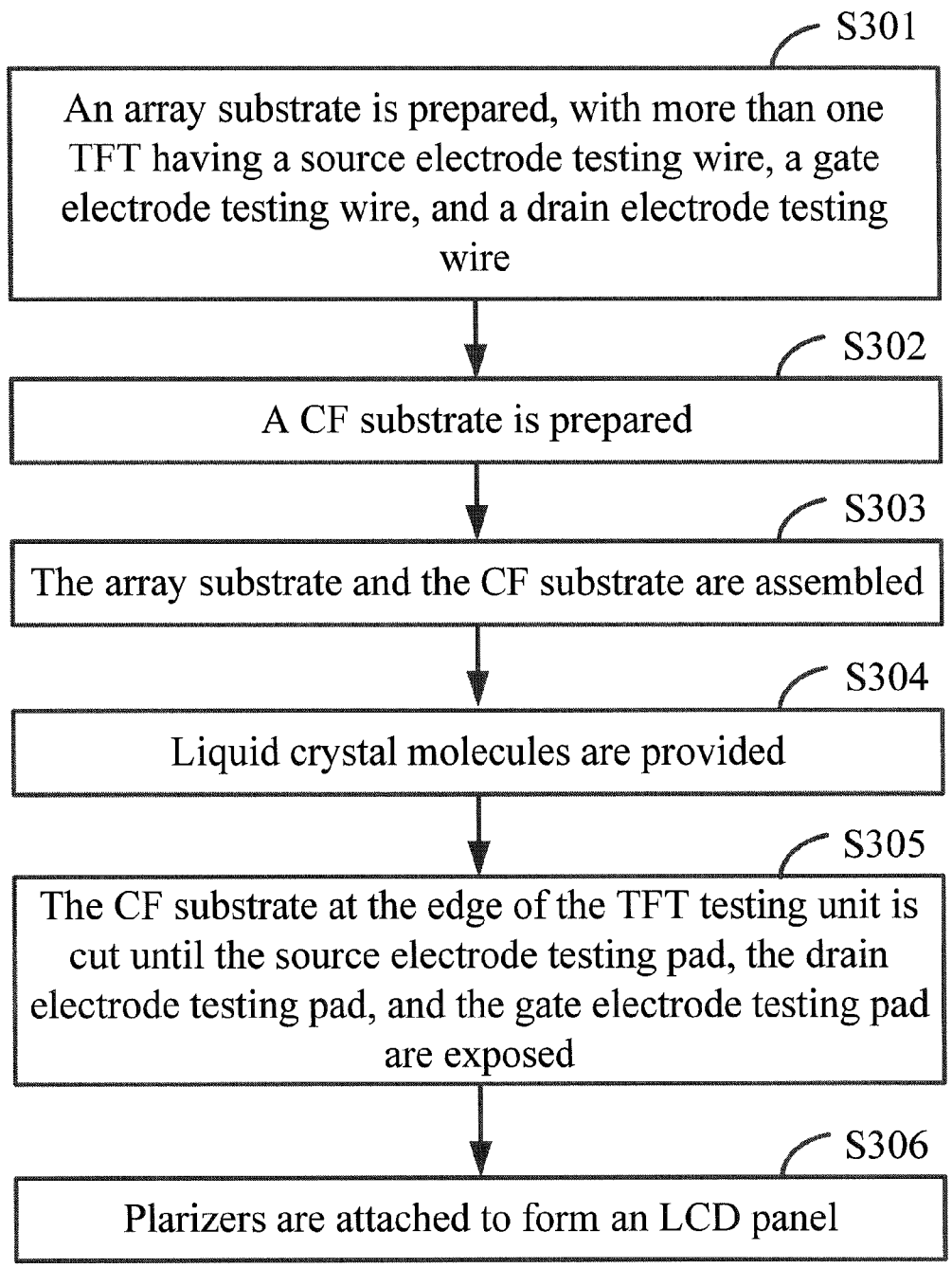
FIG. 3 is a flow chart of a manufacturing method for an LCD panel in an Embodiment Two of the present invention.

FIG. 3 illustrates a manufacturing process for an LCD panel which can be measured conveniently. It is used for the manufacture the LCD given in embodiment one.

In Step S301, an array substrate is prepared, wherein the array substrate comprises: a plurality of TFTs, source electrode testing pads, drain electrode testing pads, and gate electrode testing pads.

Wherein, at least one TFT is used to form a TFT testing unit. That is, leading three testing wires from a gate electrode, a drain electrode, and a source electrode of the TFT, which respectively are: a gate electrode testing wire having one end connected to the gate electrode, and the other end connected to the gate electrode testing pad; a source electrode testing wire having one end connected to the source electrode, and the other end connected to the source electrode testing pad; a drain electrode testing wire having one end connected to the drain electrode, and the other end connected to the drain electrode testing pad.

In Step S302, a CF substrate is prepared. This step is the same as the traditional process, and is not repeated herein.

In Step S303, the array substrate and the CF substrate are assembled by a sealant to define a holding space formed by the array substrate, the CF substrate, and the sealant.

It should be understood that when the array substrate and the CF substrate are being assembled, a slot should be preserved to form the holding space. Besides that, the holding space has a hole in the sealant for injecting or providing liquid crystal molecules.

In step S304, the liquid crystal molecules are provided to the holding space through the hole for providing liquid crystal molecules to form a plurality of liquid crystal cells and at least one TFT testing unit.

It should be understood that the liquid crystal molecules may be injected or provided into the holding space either through the reserved hole, or by cutting off part of the holding space to form a injection hole. In addition, after the injection of liquid crystal molecules, the injecting hole should be sealed.

In step S305, the CF substrate at the edge of the TFT testing unit is cut until the source electrode testing pad, the drain electrode testing pad, and the gate electrode testing pad are exposed, for testing the TFT.

It should be understood that when testing, the source electrode testing pad, the drain electrode testing pad, and the gate electrode testing pad are connected to a testing device, respectively. The quality of the LCD panel is evaluated based on a test result generated by the testing device.

In step S306, polarizers are attached to the array substrate and the CF substrate to form the LCD panel.

The traditional TFT electrical measurements are implement after the preparation of the array substrate, (which is shown in step S302 in the embodiment two), but in fact the TFT electrical characteristics may be affected after the liquid crystal cell is finished. Therefore, the electrical measurements in this step are not accurate enough.

However, the present invention can completely eliminate the electrical measurements in the liquid crystal cells by adding the three electrode testing wires at the preparation time of the array substrate of the liquid crystal cell, thereby ensuring the accuracy of the testing data.

Besides that, the LCD panel and the manufacturing method thereof has the further advantages of being simple and reducing costs. After completing the test, the test TFT unit can also be removed in order to saving space.

It should be understood that the present invention has been described with reference to certain preferred and alternative embodiments which are intended to be exemplary only and do not limit the full scope of the present invention as set forth in the appended claims.

What is claimed is:

1. An LCD panel, comprising: at least one testing interface having a source electrode testing pad, a drain electrode testing pad, and a gate electrode testing pad, a plurality of liquid crystal cells, and at least one TFT testing unit disposed close to the testing interface, wherein the TFT testing unit comprises:

a TFT provided with a source electrode, a drain electrode, and a gate electrode;

a sealant surrounding the TFT and combining an array substrate and a CF substrate;

a gate electrode testing wire, having one end connected to the gate electrode, and the other end passing through the sealant to connect to the gate electrode testing pad;

a source electrode testing wire having one end connected to the source electrode, and the other end passing through the sealant to be connected to the source electrode testing pad;

a drain electrode testing wire having one end connected to the drain electrode, and the other end passing through the sealant to be connected to the drain electrode testing pad; and liquid crystal molecules provided between the array substrate and the CF substrate for simulating an environment of the liquid crystal cells.

2. The LCD panel as claimed in claim 1, wherein the TFT testing unit and the liquid crystal cells grow together.

3. The LCD panel as claimed in claim 1, wherein the source electrode testing pad, the drain electrode testing pad, and the gate electrode testing pad are all metal sheets.

4. An LCD panel, comprising: a plurality of liquid crystal cells, at least one TFT testing unit, a source electrode testing pad, a drain electrode testing pad, and a gate electrode testing pad, wherein the TFT testing unit comprises:

a TFT provided with a source electrode, a drain electrode, and a gate electrode;

a sealant surrounding TFT and combining an array substrate and a CF substrate;

a gate electrode testing wire, having one end connected to the gate electrode, and the other end passing through the sealant to connect to the gate electrode testing pad;

a source electrode testing wire, having one end connected to the source electrode, and the other end passing through the sealant to connect to the source electrode testing pad;

a drain electrode testing wire, having one end connected to the drain electrode, and the other end passing through the sealant to connect to the drain electrode testing pad.

5. The LCD panel as claimed in claim 4, wherein the TFT testing unit is disposed on one side close to the source electrode testing pad, the drain electrode testing pad, and the gate electrode testing pad.

6. The LCD panel as claimed in claim 4, wherein the TFT testing unit further comprises liquid crystal molecules, provided between the array substrate and the CF substrate, for simulating an environment of the liquid crystal cells.

7. The LCD panel as claimed in claim 6, wherein the TFT testing unit and the liquid crystal cells grow together.

8. The LCD panel as claimed in claim 4, wherein the source electrode testing pad, the drain electrode testing pad, and the gate electrode testing pad are all metal sheets.

* * * * *